Inventors
Hans Bincer
John R. Boxcer
By
Attorney

Sept. 20, 1960  H. BINCER ET AL  2,953,017
APPARATUS FOR ULTRASONICALLY TESTING WELDS
Filed June 27, 1956  8 Sheets-Sheet 2

*Inventors*
Hans Bincer
John R. Boxcer
By *J. P. Moran*
*Attorney*

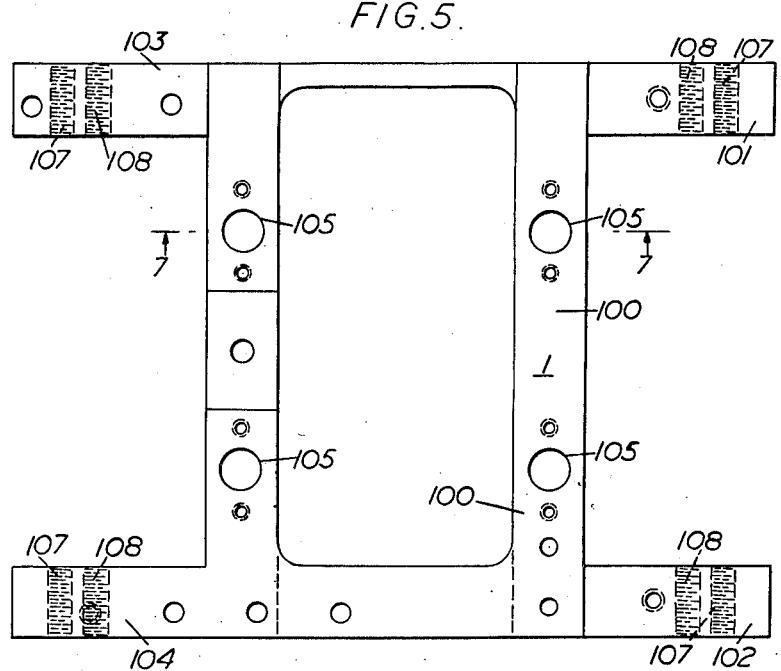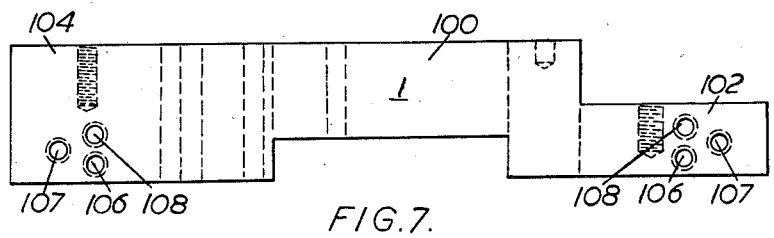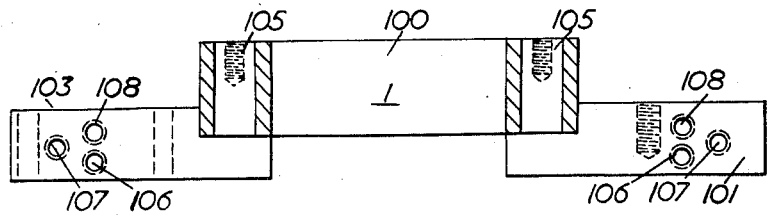

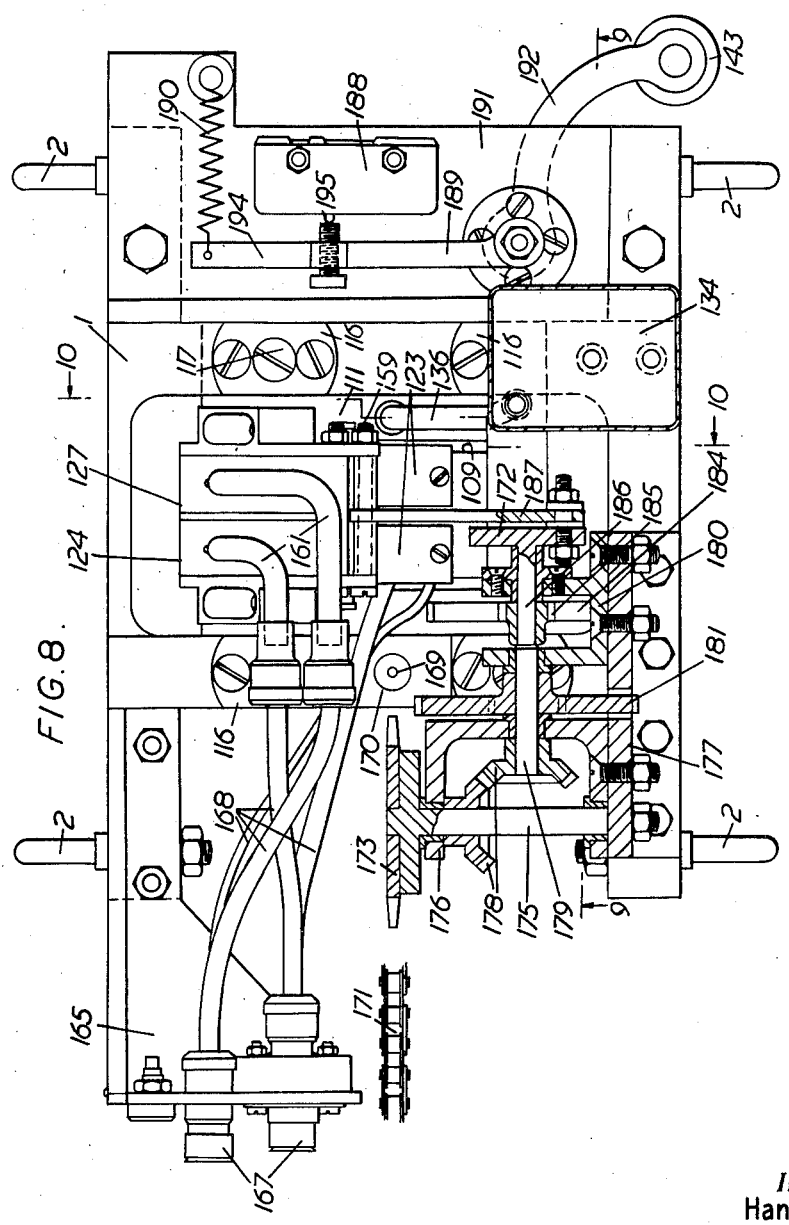

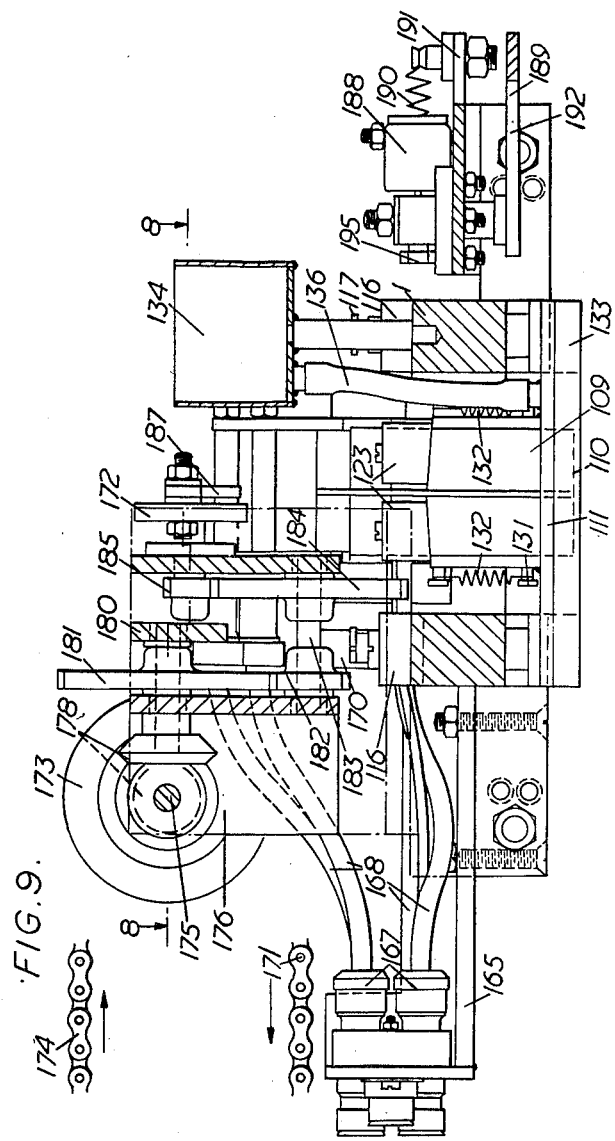

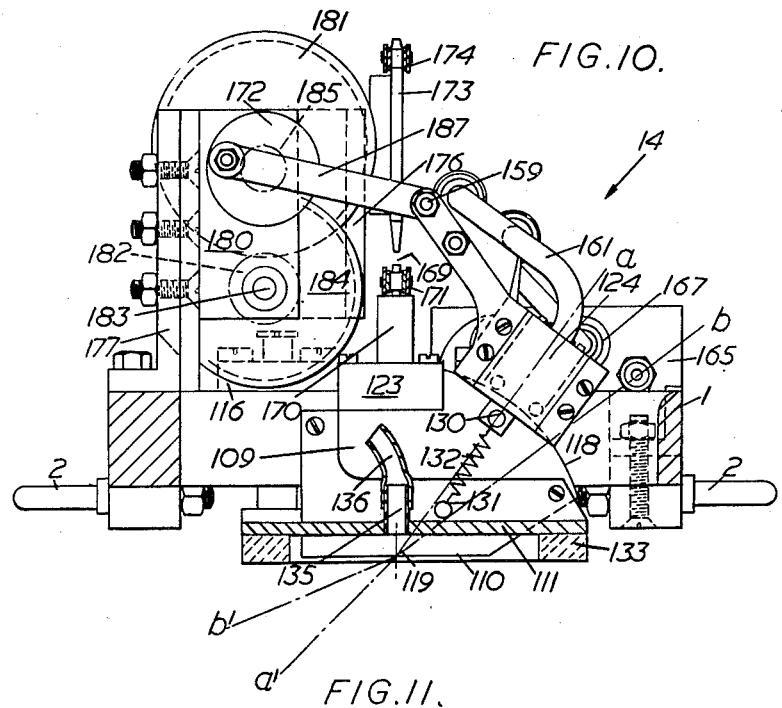
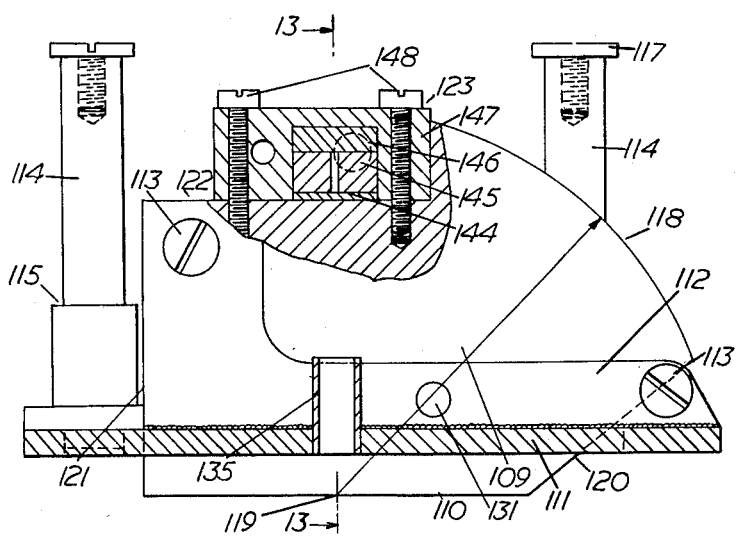

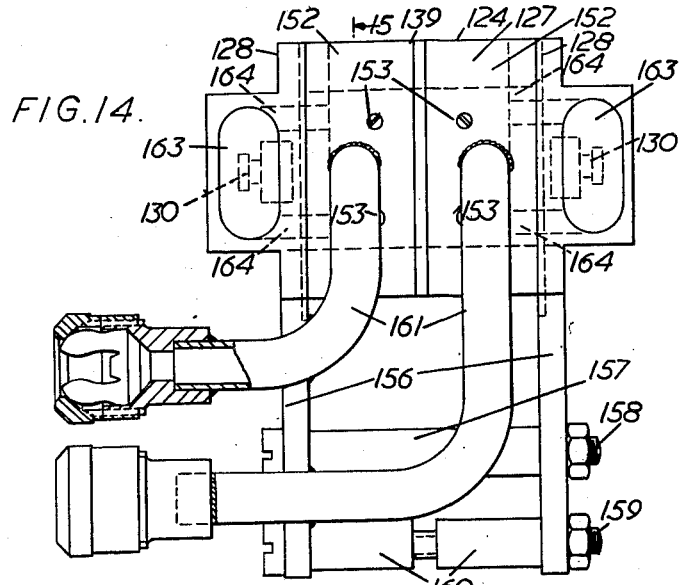

United States Patent Office 2,953,017
Patented Sept. 20, 1960

2,953,017

APPARATUS FOR ULTRASONICALLY TESTING WELDS

Hans Bincer, Glasgow, and John R. Boxcer, Helensburgh, Scotland, assignors to The Babcock & Wilcox Company, New York, N.Y., a corporation of New Jersey Filed June 27, 1956, Ser. No. 594,172

Claims priority, application Great Britain July 4, 1955

4 Claims. (Cl. 73—67.8)

This invention relates to an apparatus for ultrasonically testing welds and particularly long butt welds, for example, longitudinal welds in cylindrical pressure vessels.

In the non-destructive testing of a workpiece by ultrasonic examination, supersonic waves, generated by an electric-acoustic transducer, are sent through a liquid coupling into the workpiece and, in the event of waves being reflected by a fault constituting a discontinuity, the reflections are received by the same transducer or by a separate transducer and serve to produce an indication on an oscilloscope. Hitherto, in testing long butt welded joints, the probe or each probe comprising a transducer has been applied manually. With such operation, a probe operator is required, the continuity and effectiveness of examination depend upon the skill and application of the operator and the examination occupies a considerable time.

Moreover, in testing welds in workpieces too large to immerse in a bath of liquid, the practice has been followed of wetting the surface of the workpiece, in the neighborhood of the weld to be tested, with a film of coupling liquid. In practice, however, it is found that the use of a film leads to considerable variations in the effectiveness of the transmission of supersonic waves between probe and workpiece.

The difficulty of ultrasonically testing a butt weld in a satisfactory manner is increased when the weld is a longitudinal weld in a cylindrical pressure vessel, since the positioning of the probe in relation to the weld is influenced not only by surface irregularities of the workpiece but also by variations in curvature of the wall of the vessel in then neighborhood of the weld. As will be understood, the consequent variations in the positioning of a probe located a constant distance from the center of the weld will be accompanied by corresponding deviations from the desired location in the weld, for instance, the root, at which the ultrasonic beam impinges.

In accordance with the present invention, an elongated butt weld between parts of a workpiece is ultrasonically tested by first positioning a track in adjacent parallel relation to the weld. This track supports a carriage on which are mounted probe means biased toward the surface of the workpiece at or adjacent the weld, the workpiece surface to which the probes are applied being covered with a coupling liquid. As the carriage is moved along the track, the probe means are operated to detect flaws in the weld.

A plurality of probe means is mounted on the carrier or carriage, and the probe means are so arranged that beams of ultrasonic waves from respective probes are directed toward different regions in the depth of the weld. Preferably, part of the probe means is oscillated during movement along the weld to effect sweeping of the ultrasonic beam through a suitable range in the direction of the depth of the weld. The probe means are biased toward the weld so that probe faces are in contact therewith.

More specifically, the probe means include an ultrasonic wave transmitting body positioned so that a face of the body is urged into contact with the weld. One surface of this body is formed as a convex surface curved transversely of the track and with its center of curvature in such weld contacting face. A head is provided with an ultrasonic wave transmitting portion having a concave surface engageable with such convex surface and concentric therewith, the concave surface of the head sliding over the convex surface of the body. This head is oscillated relative to the body, as the carriage traverses the track, and the head and body are fitted, respectively, with fault finding and contact testing electro-acoustic transducing means arranged to transmit and receive ultrasonic vibrations in a direction toward the center of the curved surfaces.

For an understanding of the invention principles, reference is made to the following description of a typical embodiment thereof as illustrated in the accompanying drawing. In the drawing:

Figure 5 is a plan view of a carriage for the probe means;

Figure 6 is a side view of the carriage;

Figure 7 is a sectional side view, taken on the line 7—7 of Figure 5;

Figure 8 is a sectional plan view showing the carriage, the probe means and a fragment of the lower run of a driving chain, the section being taken on the line 8—8 of Figure 9;

Figure 9 is a sectional side view taken on the line 9—9 of Figure 8;

Figure 10 is a sectional end view taken on the line 10—10 of Figure 8;

Figure 11 shows, to a larger scale, the probe means seen in Figure 10, but with the probe head removed, a lower part of the figure being in section on the line 11—11 of Figure 12 and an upper part of the figure being partly in section on the line 11'—11' of Figure 12;

Figure 14 is a plan view of the head of the probe means looking in the direction of the arrow in Figure 10;

Figure 15 is a section taken on the line 15—15 of Figure 14 looking in the direction of the arrows; and Figure 16 is a section taken on the line 16—16 of Figure 15 and looking in the direction of the arrows.

Figure 1:
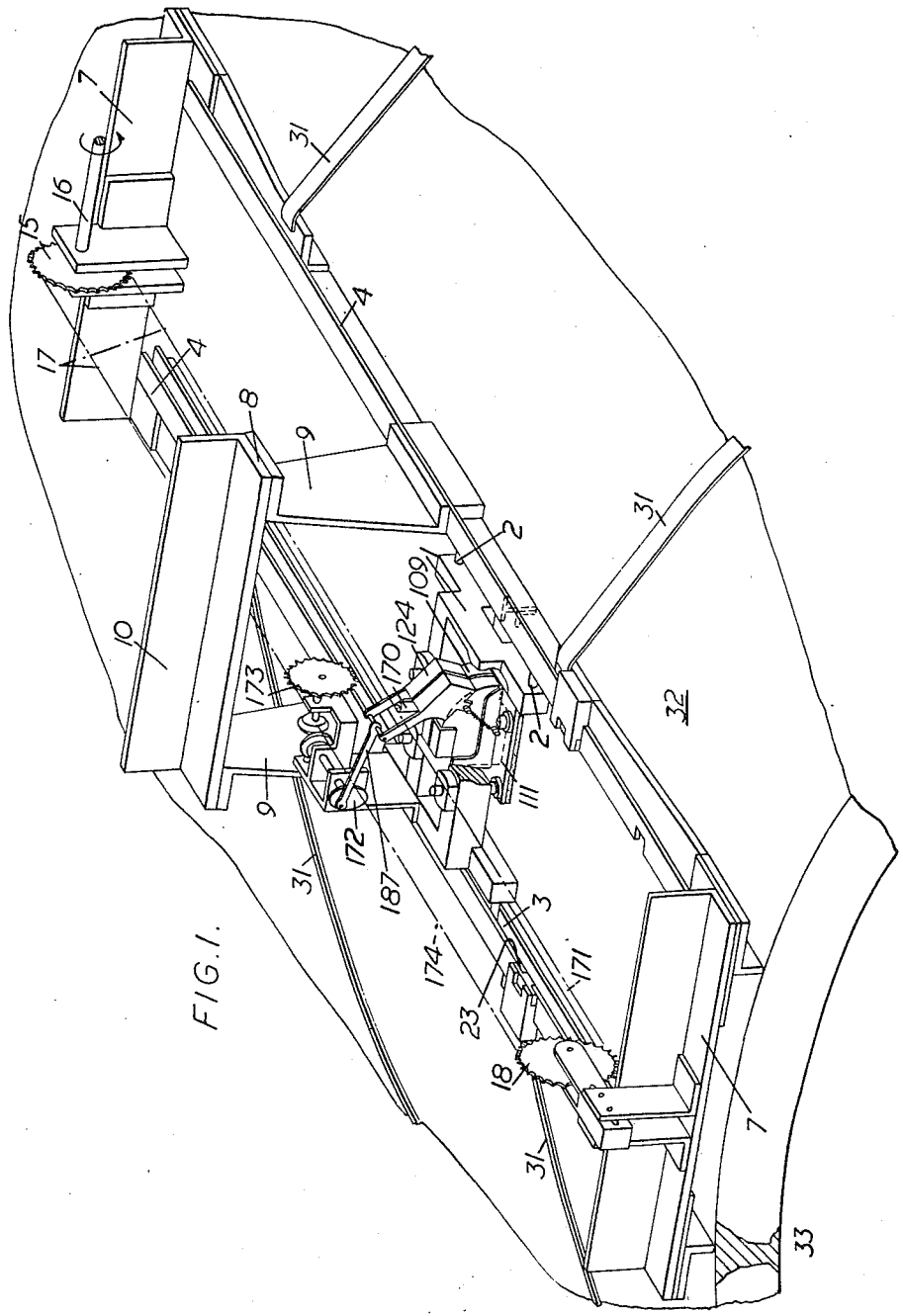
Figure 1 shows a fragment of a workpiece in the form of a cylindrical shell of a pressure vessel having applied thereto apparatus for ultrasonically testing a length of a longitudinal butt weld.

Referring to Figures 1 to 4, the carriage 1 is provided at opposite sides thereof with respective pairs of spaced cylindrical pins 2 laterally projecting and extending into grooves 3 of rails 4 constituting a track on which the carriage is able to move.

Each rail of the track includes a member 5 of T cross-section bolted to a member 6 of L cross-section, one limb of the member 6 being subjacent one half of the head of the T to form the groove 3 and extending inwardly somewhat beyond the edge of the head of the T. The rails 4 are connected at each end by an end cross member 7 and between their ends by at least one intermediate cross member 8 formed by upright side members 9 and a transom 10 sufficiently elevated to permit the passage therebelow of the unit, including the carriage 1, hereinafter described. Bolted to each member 5 at each end of the track is a reinforcing angle 11 constituting an element of the end cross member 7 at that end of the track, which member also includes gusset plates 12 which are bolted to respective reinforcing angles 11 and to a transom 13 of L-shaped cross-section.

At one end of the track, the end cross member 7 is provided with a bracket on which is rotatably mounted a driving sprocket wheel 15 centrally located between the rails 4 and provided with a driving shaft 16 coupled through gearing to an electric driving motor (not shown) advantageously also mounted upon the end cross member.

The sprocket wheel 15 is arranged to drive an endless driving chain 17 which at the other end of the track passes around an idler sprocket wheel 18 centrally disposed in relation to the rails 4 and rotatably mounted on a forked member 19 supported by a bracket 20 mounted upon the adjacent cross member 7. The forked member 19 is formed with a slot 21, and clamping bolts 22 passing through the arms of the bracket 20 extend through the slot. Normally the bolts maintain the forked member 19 firmly in position, but upon loosening the nuts on the bolts the forked member may be moved in relation to the bracket 20 in order to adjust the tensioning of the chain 17.

Figure 2:
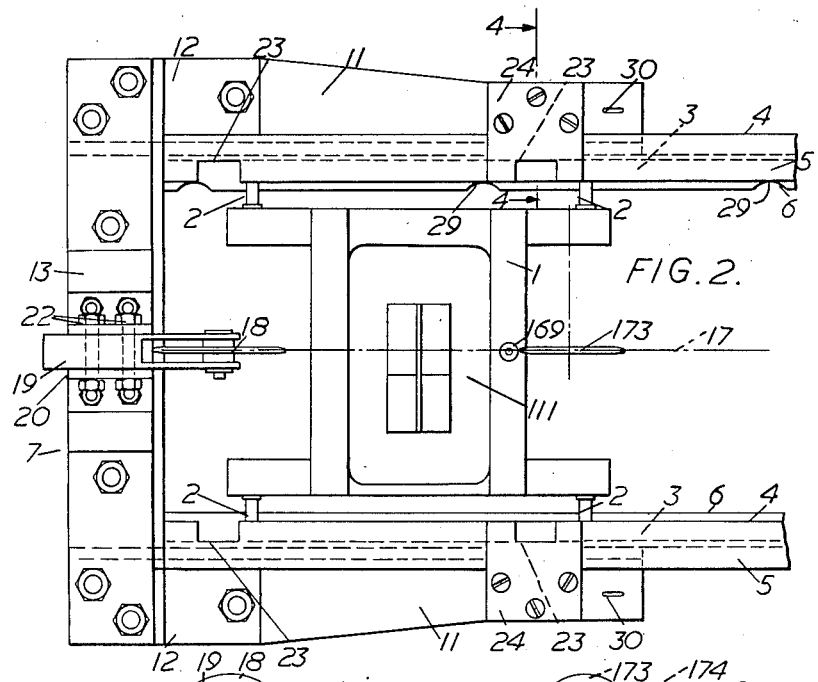
Figure 2 is a plan view of an end part of a track of the apparatus and a carriage mounted on the track and certain elements associated with the carriage.
Figure 3:
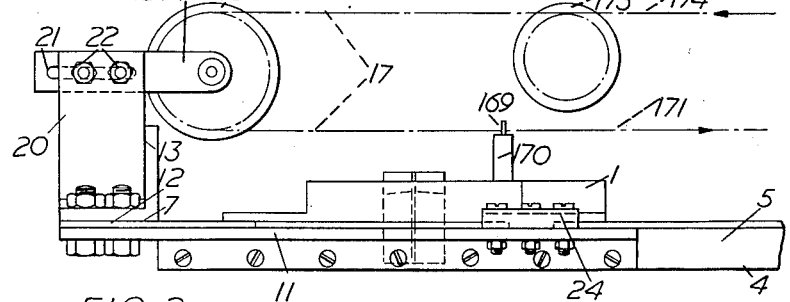
Figure 3 is a side view corresponding to Figure 2.
Figure 4:
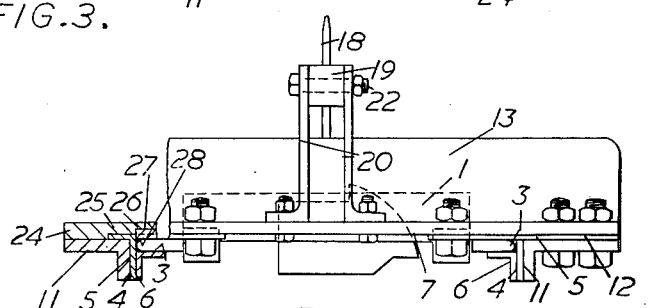
Figure 4 is an end view looking from the left of Figure 3, a part, however, being broken away to disclose a section on the line 4—4 of Figure 2.

In Figures 2 and 3, the carriage 1 is shown in an extreme position in relation the the track and it will be observed that, somewhat nearer the extremity of the track than the pins 2, the inner flanges of the members 5 of the rails are formed with slots 23 so arranged that upon movement of the carriage 1 a short distance to the left as seen in Figure 2 the pins 2 may be moved through the slots 23 in order to remove the unit of which the carriage forms part from the track. By the reverse process the carriage may be placed in position in relation to the track. In order that the whole track with the exception of a short distance in the neighborhood of the slots 23 nearest the adjacent cross member 7 may be utilized, the slots 23 furthest from the cross member are normally closed. To this end there are bolted to the reinforcing angles 11 plates 24 which respectively overlap the T heads of the members 5 and in which are formed slots corresponding to the subjacent slots 23 in the rails 4. As best seen from Figure 4, each plate 24 is formed on its underside with a step 25 for the accommodation of the head of the member 5 and with a second step 26 to form between the plate 24 and the member 5 in the vicinity of the slot 23 a recess for the accommodation of a metal strip 27. The metal strip 27 is formed below with a lug 28 adapted to fill the slot 23 in the associated rail 4. It will be appreciated that strip 27 may readily be removed in order to open the slot 23 or may be replaced in order to close the slot.

At the lower side of the slot in one of the rails 4, the inwardly extending part of the member 6 is formed in its edge and throughout the length of the rail with equidistantly spaced arcuate recesses 29 adapted to cooperate with a roller at one end of a switch lever as hereinafter described.

The reinforcing angles 11 at each end of the track are formed with apertures 30 in which are engaged straps 31 encircling the workpiece 32 in order to maintain the rails 4 properly positioned in relation to the weld 33 to be tested. If desired, an additional securing means may be taken around the workpiece and over the transom 10.

Suitably, the rails and cross members are of aluminum and the rails possess a degree of resilience enabling them to conform to a cetrain degree with undulations in the surface of the workpiece extending in the direction of the weld. The pins, being of circular cross section and engaging the rails at the bottoms and tops of the slots thereof, the danger of jamming owing to unevenness of the rails when installed on the workpiece is avoided.

Referring more particularly to Figures 5 to 7, the carriage 1 comprises a frame-like part 100 from which extend in one direction the two arms 101 and 102 and in the opposite direction the two arms 103 and 104. The upper surfaces of the arms, with the exception of the arm 104, are below the upper surface of the frame-like part and the lower surfaces of the arms are below the lower surface of the frame-like part except at the corners thereof from which the arms project, so that the frame-like part is in general at a higher level than the arms. Two holes 105 for the passage of plungers and the reception of helical biassing springs are formed in the side of the part 100 extending between the arms 101 and 102 and in the side of the said part extending between the arms 103 and 104. The side of the part 100 extending between the arms 101 and 103 is of reduced thickness and the side is formed internally with an upper bevel.

Each of the arms 101, 102, 103 and 104 is formed with transverse holes 106, 107 and 108 for the reception of the pins 2. By selectively fitting the pins into the holes 106, the holes 107 or the holes 108, which are at different predetermined distances from the undersides of the arms, the level of the carriage in relation to the track may be varied. The holes 106, 107 and 108 therefore constitute means enabling the unit, illustrated by Figures 8, 9 and 10, to be adapted for use with cylindrical workpieces of different diameters.

Figure 12:
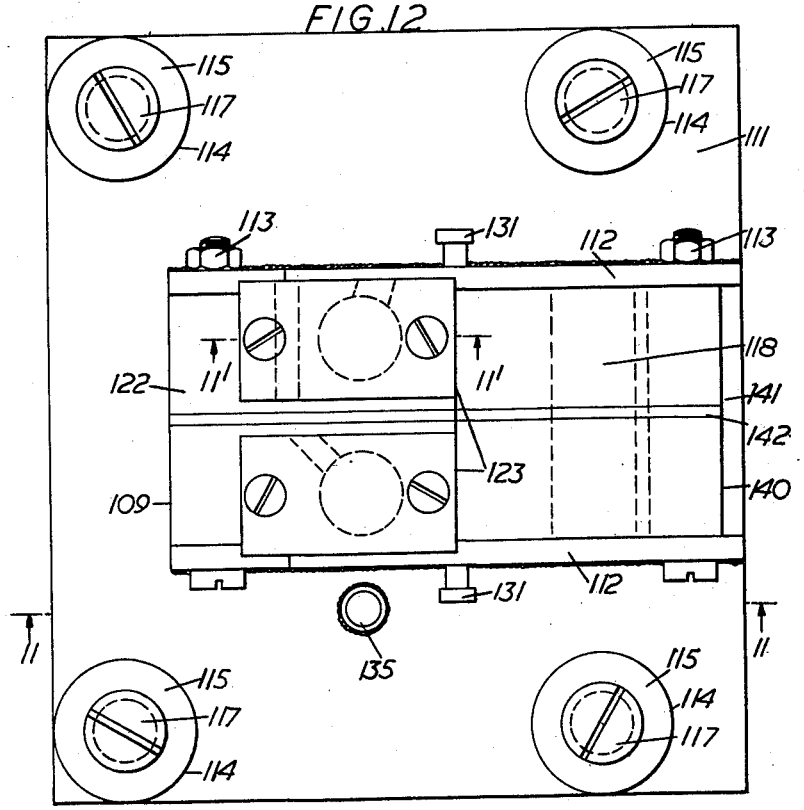
Figure 12 is a plan view corresponding to Figure 11.
Figure 13:
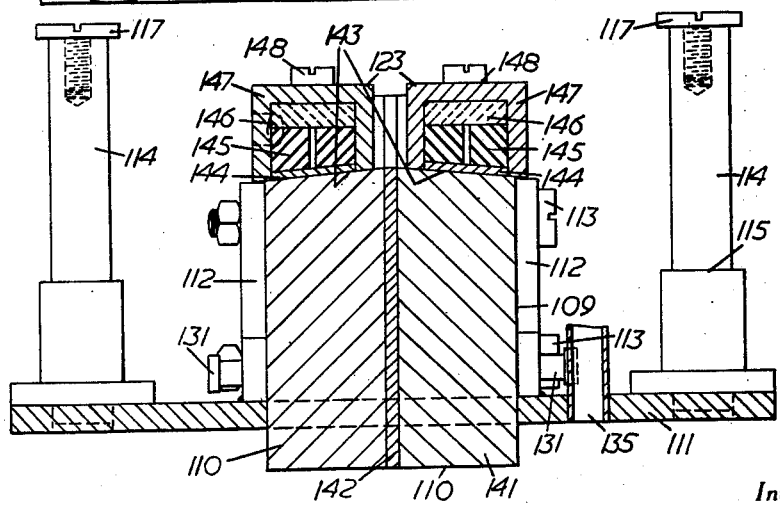
Figure 13 is a sectional elevation taken on the line 13—13 of Figure 11.

As shown by Figures 8 to 10, the carriage 1 serves to position probe means including an ultrasonic wave transmitting body 109 through positioning means adapted to urge a face 110 of the body into contact with the workpiece. Thus the body 109, as shown most clearly by Figures 11, 12 and 13, is mounted upon and extends through an aperture in a base member 111 in the form of a plate provided at the sides of the aperture with upstanding brackets 112 between which the body 109 is clamped by means of bolts 113 which pass through holes in the brackets and corresponding holes in the body. Upstanding from the base member 111 are four plungers 114 having shoulders 115 and provided at their upper ends with stop screws 117. The plungers 114 extend through respective holes 105 in the carriage and through apertures in cover plates 116, each of which is secured by two screws, as may be seen in Figure 8, to the carriage. Within each hole 105 and surrounding the associated plunger is a helical compression spring acting between the shoulder 115 of the plunger and the cover plate 116 to urge the plunger, and therefore the base member 111, in a downward direction, the movement of the plunger being limited by engagement of the stop screw 117 with a cover plate 116. The diameters of the apertures in the cover plates 116 are substantially greater than the diameters of those parts of the plungers passing therethrough so that a degree of rocking movement of the base member 111 is permitted.

With the arrangement described, the base member 111 is able to assume a position affording optimum tangential contact of the face 110 with the surface of a cylindrical workpiece, such as a drum, and the face is urged by a constant force of desirable value, determined by the characteristics of the springs, towards the workpiece.

The body 109 is formed at a flank thereof with a convex surface 118 curved in a direction transverse to the track and curved above a centre 119 located at or substantially at the face 110 of the body midway between a bevelled end 120 and an upright end 121 of the body. At the top thereof and at an end of the convex surface 118 the body is formed with a step 122 extending parallel to the face 110 and serving for the accommodation of contact-testing electro-acoustic transducer means 123 disposed immediately above the centre of curvature 119.

Associated with the body 109 is a probe head 124 including an ultrasonic wave transmitting part 125, seen in Figures 15 and 16, having a concave surface 126 curved similarly to and arranged to slide in relation to the convex surface 118 of the body, the surfaces 118 and 126 accurately fitting one another and being highly polished. The head is provided with a fault finding electro-acoustic transducer means 127 directed, as regards the transmission and reflection of ultrasonic vibrations, towards the centre of rotation 119 and means, as hereinafter described, are provided for oscillating the head in relation to the body as the carriage 1 traverses the track. The head 124 is located laterally with respect to the body 109 by parts of side plates 128 of the head which extend beyond the concave surface 126 and engage the sides of the body and the side plates 128 are formed with lugs 129 provided with pins 130 between which and pins 131 on the brackets 112 act helical tension springs 132 serving to urge the concave surface 126 of the head towards the convex surface 118 of the body.

The base member 111 is provided around the aperture through which the body 109 projects with a gasket 133 of resilient material, suitably foam plastic, adapted to be pressed by the biassing springs acting upon the plungers 114 into contact with the surface of the workpiece so as to make a substantially liquid-tight joint therewith and a reservoir 134 provided on the carriage 1 is arranged to supply liquid couplant to the space within the gasket. Thus the base member 111 is formed with an aperture fitted with a nipple 135 connected by a flexible tube 136 to a corresponding nipple projecting from the bottom of the reservoir 134.

In the arrangement described, the space within the gasket 133 is maintained substantially filled with liquid couplant supplied from the reservoir 134, there being a leakage path between the body 109 and the base member 111 sufficient to permit displacement of air within the space by the couplant. As the carriage 1 traverses the track, the main part of the pool of couplant contained within the space surrounded by the gasket 133 is moved along the workpiece so that the face 110 of the body is maintained immersed in the couplant and proper transmission of the ultrasonic vibration at the interface between the body and the workpiece is ensured in a simple, effective and troublefree manner with the expenditure of only a small amount of couplant.

Advantageously, the probe means are arranged and adapted to operate substantially in the manner described in our co-pending U.S. Patent application S.N. 519,474, now Patent No. 2,875,607, and the ultrasonic wave transmitting part 125 of the head is divided in the direction of oscillation into two similar portions 137 and 138, acoustically screened from one another by vibration absorbing packing 139, one of which bears transmitting and the other receiving electro-acoustic transducing means, while the body 109 is similarly divided into two portions 140 and 141 also acoustically screened from one another by vibration absorbing packing 142, and one portion bears transmitting and the other receiving electro-acoustic transducing means. In effect, therefore, the body 109 and the part 125 of the head are divided into two sections separated by vibration absorbing packing, the transducers of one section being adapted respectively to serve as inspecting or fault finding pulse and contact or coupling testing pulse transmitting transducers, and the transducers of the other section being adapted respectively to serve as inspecting or fault finding pulse and contact or coupling testing pulse receiving transducers. From the previous description it will be understood that the normal axes or lines of action of the transducers of each section intersect or substantially intersect at the coupling surface of that section at the face 110 of the body 109.

Suitably, the contact testing pulse transmitting transducer is arranged to transmit pulses for reflection by a surface of the workpiece opposite the surface in contact with the face 110 of the body.

Figure 13 shows that the upper surfaces of the portions 140 and 141 of the body are inclined downwardly in an outward direction, whereby the normal axes or lines of action of the contact testing pulse transmitting and receiving transducers are inclined towards one another to afford a degree of focussing over a range of thickness of workpieces to be inspected.

Suitably, the inspecting pulse and contact testing pulse transmitting transducers are associated with a common source of excitation and the inspecting pulse and contact testing pulse receiving transducers are associated with a common oscilloscope. Time delay means may be provided for preventing confusion between echoes from pulses transmitted by the inspecting pulse transmitting transducer and echoes from pulses transmitted by the contact testing pulse transmitting transducer. Such time delay means may comprise an electronic delay circuit or an ultrasonic delay line.

The contact testing electro-acoustic transducing means are clearly shown in Figures 11, 12 and 13 of the drawings, which show that with each of the portions 140 and 141 of the body is associated a contact testing piezo electric crystal 144 mounted on the upper surface 143, the crystal being positioned by a rubber pad 145, a "Tufnol" packing 146 and an enclosing brass holder 147 clamped to the body 109 by screws 148. The electrical connections to the crystals 144 are in the form of co-axial cables the metal braidings of which are respectively soldered to the holders 147.

The fault finding electro-acoustic transducing means are shown by Figures 15 and 16 of the drawings. Thus on the upper surface of each of the portions 137 and 138 of the part 125 rests a fault finding crystal 149 above which is a rubber pad 150 and a "Tufnol" packing 151, the crystal, the rubber pad and the "Tufnol" packing being covered by a channel-shaped housing member 152 and clamped in position relatively to the associated portion of the part 125 by means of clamping screws 153 passing through threaded holes in the housing member 152. It will be seen that the packing 139 serves to separate not only the portions 137 and 138 of the part 125 but also the crystals, the rubber pads, the "Tufnol" packings and the housing members. The portions 137 and 138 and the housing members 152 are maintained in position in relation to the side plates 128 of the head by clamping bolts 154, two of which pass through the side plates, the portions of the part 125 and the packing 139 and two of which pass through the side plates, the housing members and the packing. The side plates 128 are formed with inwardly projecting crystal positioning lugs 155 located between the part 125 and respective housing members.

From each side plate 128 extends an arm 156 between which is disposed a tubular spacer 157 clamped between the arms by a bolt 158. Extending between the arms at the ends thereof is a bolt 159 provided with sleeves 160 between which is a space for the accommodation on the bolt of a connecting rod associated with a crank for effecting oscillation of the head. Each housing member 152 is formed in its upper part with an aperture at which terminates a tube 161 for the passage of the co-axial cables for the transmitted and received signals respectively, these tubes being bent and suitably secured for support on one of the arms 156. The wire braidings of the cables are connected to the metal-work of the respective tubes and housing members.

The part 125 of the head is of the same material as the body 109, suitably "Perspex," and the head is provided with reservoir means for a liquid couplant arranged to supply the couplant to a groove 162 in the curved surface 126 of the said part. Thus a well 163 is formed on each side plate 128 and is connected by ducts 164 extending through the side plate and into the part 125 to the groove which is of rectangular form.

Bolted to the arm 103 of the carriage is a bracket 165 provided with terminals 167 to which are connected the cables 168 passing to the head 124. The wire connected to a position indicator switch referred to below is also provided with a terminal on the bracket 165 and in this way the transmission to the probe means or the said switch of the forces from the cables leading from the unit to associated electronic apparatus is avoided.

The carriage 1 is provided with coupling means in the form of a pillar 170 formed at its upper end with a pin 169 for engaging the lower run 171 of the driving chain, the arrangement being such that the pin may readily be disengaged from the chain or inserted in any selected link of the chain. The head 124 is connected through means including a crank 172 and gearing to a sprocket wheel 173 adapted to engage the upper run 174 of the driving chain. The sprocket wheel 173 is mounted upon a shaft 175 having bearings in a first auxiliary bracket 176 which is bolted to a main bracket 177 secured to the arm 104 of the carriage. The shaft 175 acts through bevel wheels 178 to drive a shaft 179 having bearings in the bracket 176 and a second auxiliary bracket 180 also bolted to the main bracket, the shaft 179 having keyed thereto a spur wheel 181. The spur wheel 181 is in mesh with a pinion 182 mounted on a shaft 183 having bearings in the brackets 176 and 180 and carrying a spur wheel 184 in mesh with a pinion 185 mounted on crank shaft 186 rotatably mounted in the bracket 180 and carrying the crank 172, which is connected by a rod 187 to the bolt 159 of the head 124.

It will be understood that, when the chain is driven, the lower run 171 thereof effects traversing of the unit along the track. It therefore follows that there is a relative movement between the carriage and the upper run 174 of the chain equal to twice the velocity of movement of the lower run of the chain. As a consequence, the sprocket wheel 173, by virtue of its engagement with the upper run of the chain, is driven and serves through the crank 172 and the intermediate gearing to actuate the connecting rod 187 and thereby to oscillate the head 124 in relation to the body 109. The relationship between the frequency of oscillation of the head and the velocity of the carriage along the track may be modified as desired by changing the velocity ratios of meshing gear wheels between the sprocket wheel 173 and the crank 172, but the arrangement, for example, may be such that a complete to and fro movement of the head is affected as the carriage moves through a distance of $\frac{1}{10}$ of an inch. The amplitude of the oscillatory movement of the head may be varied by adjustment of the throw of the crank, but, by way of example, the arrangement may be such that the centre line of the head moves through the angle $a$–119–$b$, shown by Figure 10, thereby giving a beam sweep of 25° shown by the angle $a'$–119–$b'$ in a workpiece formed of steel.

The carriage 1 supports an electric switch 188 having an operating lever 189 biased to a switch closing position by a tensioned spring 190. The switch, the lever and the pillar to which an end of the spring is secured are mounted on a platform 191 bolted to the arms 101 and 102 of the carriage. As shown, the lever comprises a suitable pivot pin passing through platform 191, an arm 192 below the platform bearing at its extremity a roller 143 and an arm 194 above the platform provided with an adjusting screw 195 adapted to engage a complementary part of the switch 188 and enabling the position of the lever at which the switch is actuated to be adjusted.

In operation, the roller 143 engages the lower flange of the track rail formed with the equi-distantly spaced recesses 29. The parts of the flange between the recesses constitute equi-distantly spaced complementary actuating means which serve to effect movement of the lever 189 to the switch open position and to maintain the lever in that position until the roller reaches a recess, whereupon the roller by entering the recess effects rotation of the lever under the influence of the spring 190 and closing of the switch 188. The quickly following movement of the roller 193 out of the recess effects rotation of the lever in the opposite direction and reopening of the switch. A momentary electrical impulse is therefore given by the closing of the switch which is utilized to indicate the position of the unit in relation to the length of the track and therefore in relation to the weld undergoing test.

The apparatus described may quickly be installed in operative position in relation to a butt weld to be tested and when the butt weld is of such length that a single traverse of the track by the unit is insufficient to cover the whole length the track successive lengths of the weld may be tested one after the other by repositioning the track on the workpiece and testing the lengths one by one.

Once the track and unit are located in relation to a length of weld to be tested, the reservoirs are filled with couplant and the electrical circuits are established, the testing is effected automatically by the traversing of the unit by the electric driving motor along the track and the record obtained is correlated with the position of the probe means in relation to the weld. Throughout the movement correct coupling between the probe means and the workpiece is ensured without effort on the part of an operator and the oscillation of the head ensures direction of the fault finding ultrasonic beam to a desired location in the depth of the weld notwithstanding variations in the curvature of the surface of the workpiece.

While a specific embodiment of the invention has been shown and described in detail to illustrate the application of the invention principles, it will be understood that the invention may be embodied otherwise without departing from such principles.

What is claimed:

1. Apparatus for ultrasonically testing an elongated butt weld in a welded structure comprising, in combination, track means, including a pair of parallel rails, constructed and arranged for mounting on the structure adjacent and parallel to the weld; a carriage movable along said track means; probe means mounted on said carriage to transmit a beam of ultrasonic vibrations into the weld and detect reflected ultrasonic vibrations; means biasing said probe means toward substantial surface contact with the surface of the weld; bridge means interconnecting and spacing said rails at each end of said track means; a pair of sprockets each mounted on one of said bridge means substantially above said rails for rotation about horizontal axes; an endless chain engaged over said sprockets; and coupling means on said carriage engageable in the lower run of said chain.

2. Apparatus as claimed in claim 1 wherein said probe means are mounted on said carriage for slight rocking movement relative thereto to adjust to the surface of the work.

3. Apparatus as claimed in claim 1 in which there are plural probe means mounted side-by-side in acoustically isolated relation and each including a vibration transmitting body having a work contacting surface and a convex surface opposite said contacting surface and curved, about a center in the work contacting surface, transversely of the direction of movement of the probe means along the work, and an ultrasonic vibration transmitting head having a concave surface engaging said convex surface for oscillation of said head relative to said body about such center in the work contacting surface of said body; and means, including said endless chain, for oscillating said heads at a rate coordinated with the rate of movement of the carriage along the track means; one of said probe means transmitting contact testing pulses and the other probe means transmitting fault detecting pulses.

4. Apparatus as claimed in claim 1 in which there are plural probe means mounted side-by-side in acoustically isolated relation and each including a vibration transmitting body having a work contacting surface and a convex surface opposite said contacting surface and curved, about a center in the work contacting surface, transversely of the direction of movement of the probe means along the work, and an ultrasonic vibration transmitting head having a concave surface engaging said convex surface for oscillation of said head relative to said body about such center in the work contacting surface of said body; and means for oscillating said heads at a rate coordinated with the rate of movement of the carriage along the track means, said last-named means including a connection to said driving means; one of said probe means transmitting contact testing pulses and the other probe means transmitting fault detecting pulses.

References Cited in the file of this patent

UNITED STATES PATENTS

| | | |
|---|---|---|
| 1,415,933 | Hume | May 16, 1922 |
| 1,821,500 | Dunn | Sept. 1, 1931 |
| 2,601,477 | Webb et al. | June 24, 1952 |
| 2,642,815 | Baigent | June 23, 1953 |
| 2,645,938 | Billstein | July 21, 1953 |
| 2,667,780 | Van Valkenburg | Feb. 2, 1954 |
| 2,740,289 | Van Valkenburg et al. | Apr. 3, 1956 |
| 2,770,966 | Halliday et al. | Nov. 20, 1956 |
| 2,813,421 | Cheney et al. | Nov. 19, 1957 |

FOREIGN PATENTS

| | | |
|---|---|---|
| 726,824 | Great Britain | Mar. 23, 1955 |
| 719,641 | Great Britain | Dec. 8, 1954 |
| 893,459 | France | Jan. 31, 1944 |
| 1,065,907 | France | Jan. 31, 1954 |